May 1, 1934. E. J. PERRY 1,956,589
METHOD OF CLEANING, DRYING, AND AERATING WEARING APPAREL OR THE LIKE
AND APPARATUS FOR CARRYING OUT SAID METHOD
Filed Jan. 4, 1932   6 Sheets-Sheet 1

Inventor
Emanuel J. Perry

By Bacon & Thomas
Attorneys

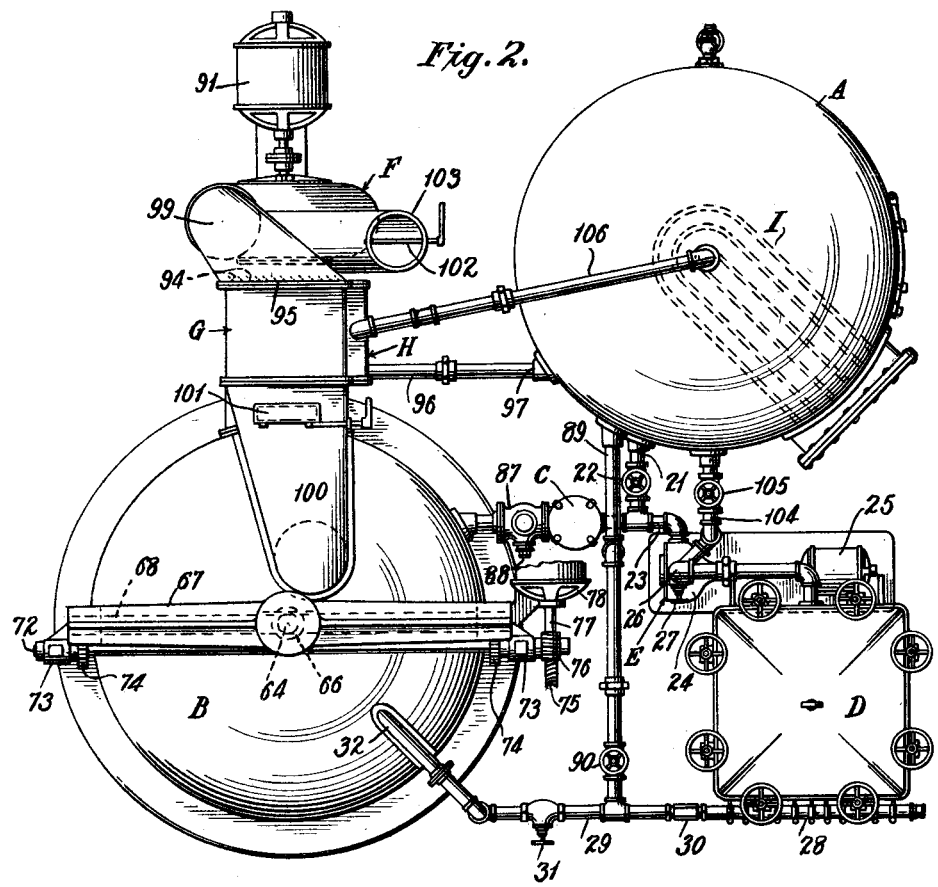
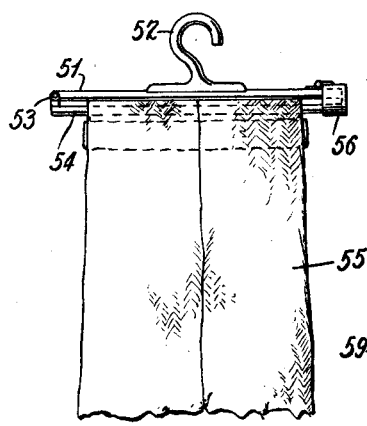
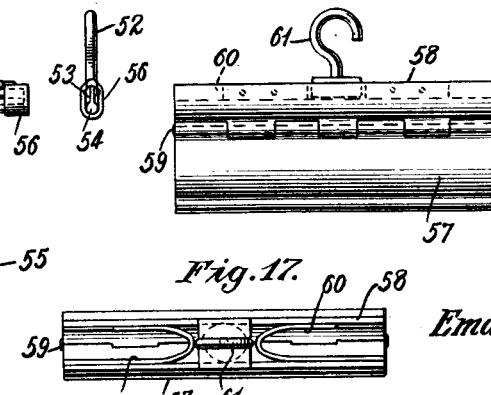
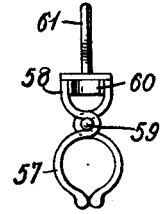

May 1, 1934.  E. J. PERRY  1,956,589
METHOD OF CLEANING, DRYING, AND AERATING WEARING APPAREL OR THE LIKE
AND APPARATUS FOR CARRYING OUT SAID METHOD
Filed Jan. 4, 1932  6 Sheets-Sheet 3
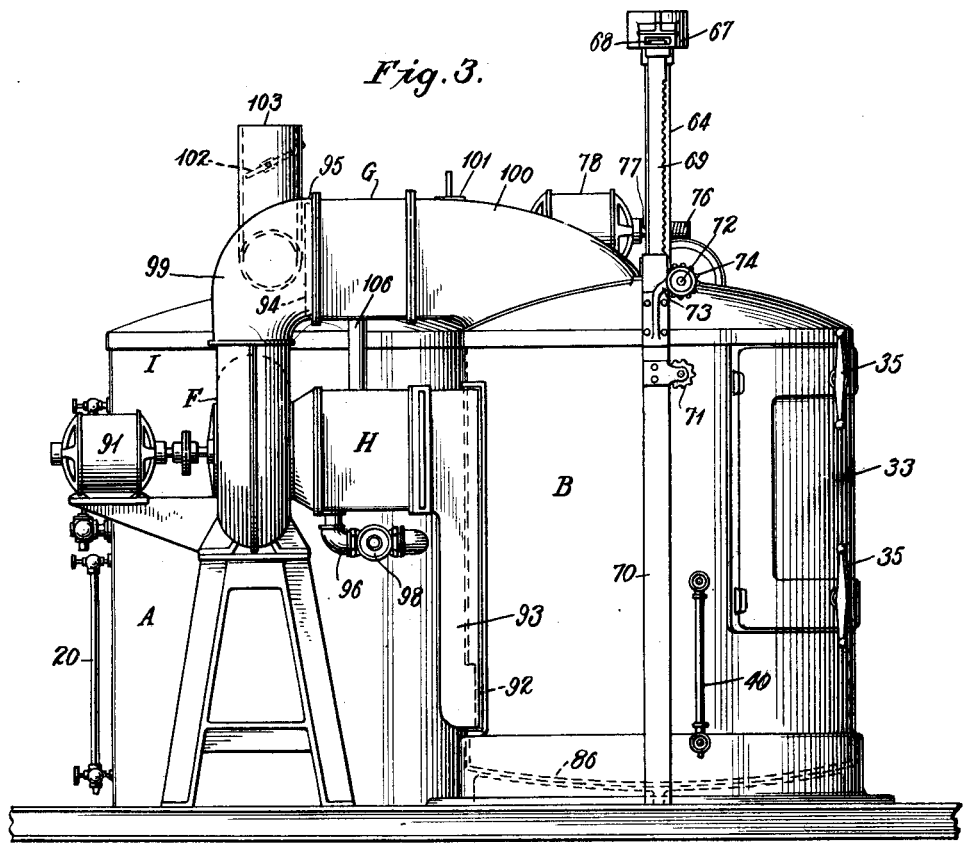
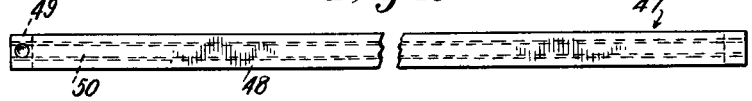
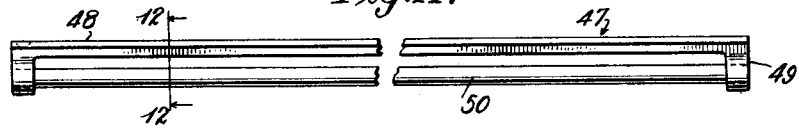
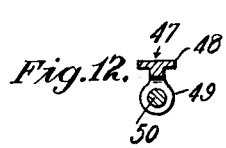
Inventor
Emanuel J. Perry
By  Bacon & Thomas
Attorneys

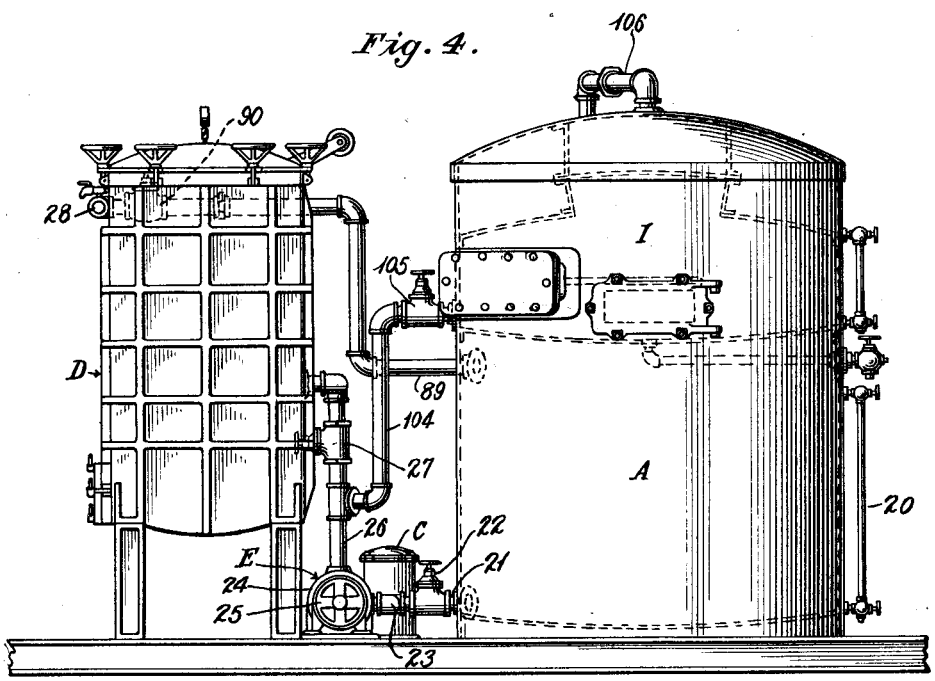
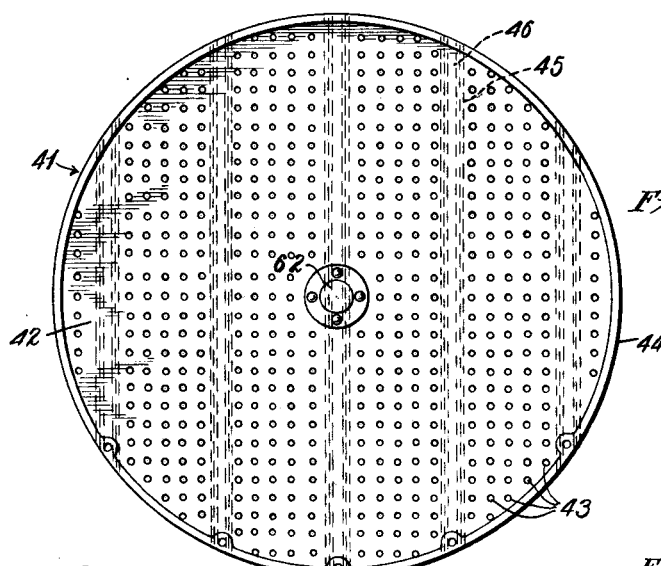
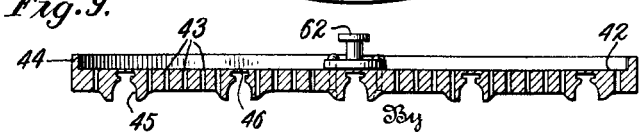

May 1, 1934.  E. J. PERRY  1,956,589
METHOD OF CLEANING, DRYING, AND AERATING WEARING APPAREL OR THE LIKE
AND APPARATUS FOR CARRYING OUT SAID METHOD
Filed Jan. 4, 1932  6 Sheets-Sheet 5

Inventor
*Emanuel J. Perry*

By
*Bacon & Thomas*
Attorneys

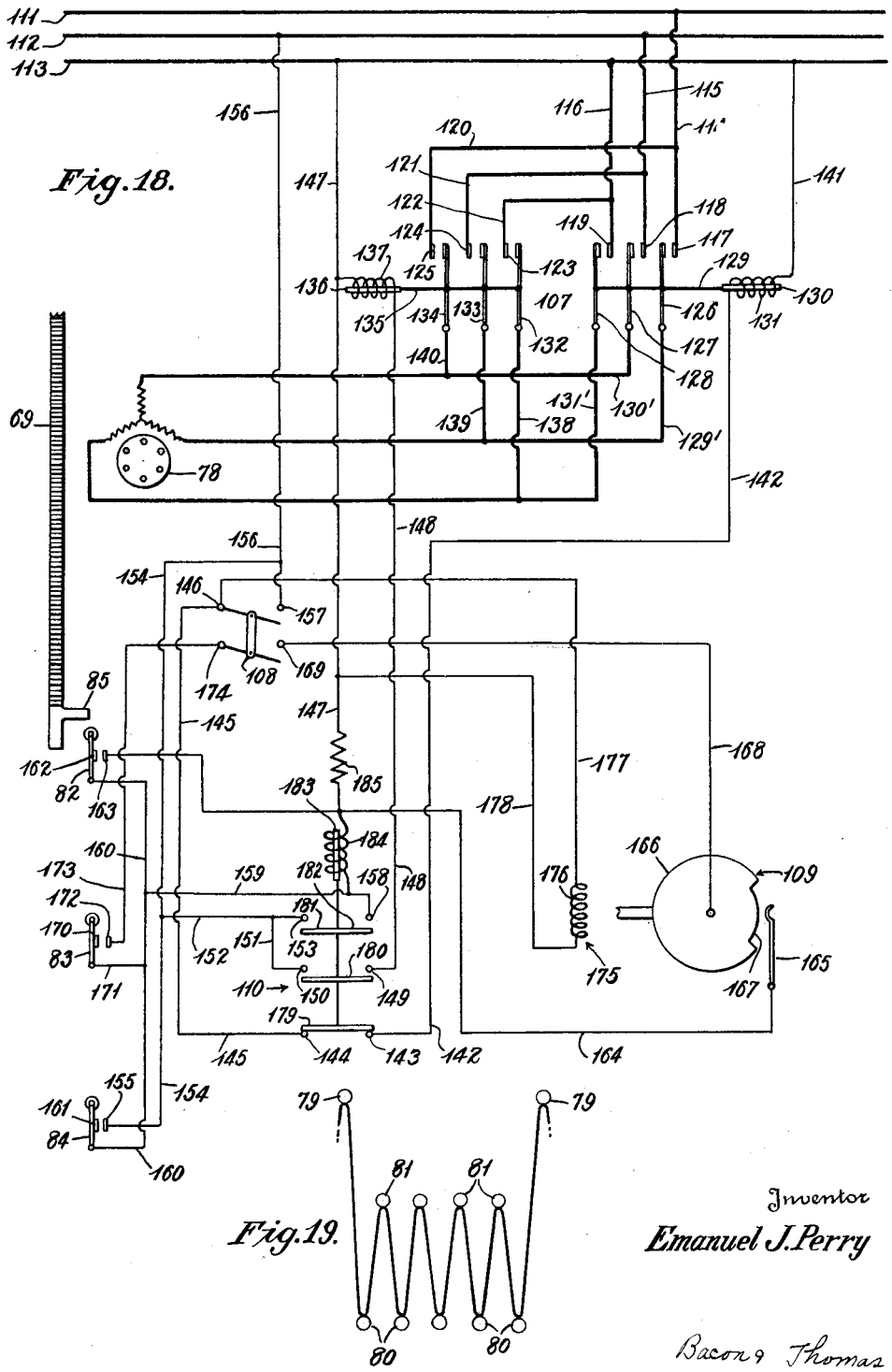

Patented May 1, 1934

1,956,589

UNITED STATES PATENT OFFICE 1,956,589

METHOD OF CLEANING, DRYING, AND AERATING WEARING APPAREL OR THE LIKE AND APPARATUS FOR CARRYING OUT SAID METHOD

Emanuel J. Perry, New Bedford, Mass.

Application January 4, 1932, Serial No. 584,712

16 Claims. (Cl. 68—38)

This invention relates to a new method of cleaning, drying and aerating various articles, preferably wearing apparel or the like, and a complete plant or apparatus for carrying out the method.

The primary object of this invention is to provide a method especially designed for commercial use in cleaning various articles made from fabrics, furs, or other fibrous material, and, preferably, articles such as wearing apparel. It further is an important object of this invention to provide a suitable apparatus or complete plant for carrying out this new method.

It has been customary in the past to employ a rotatable drum or washing cylinder positioned in a casing containing a cleaning solvent for washing or dry cleaning silk, woolen, cotton, and fur articles in commercial cleaning plants. This rotatable drum or cylinder type of cleaner is ideal for washing cotton articles, as cotton is very absorbent and absorbs dirt and impurities along with moisture. Woolen and silk articles are of a different nature. Wool is animal matter, and the fibers are of a greasy nature which will not absorb dirt, the dirt simply adhering to the surface of the fiber so that it is easily removed by a gentle rinsing operation. Silk and various types of rayon are of a vegetable nature. Real silk is the result of a chemical change accomplished by the silk worm during mastication of mulberry leaves, upon which it feeds, and results in a fine silky fiber that is very slightly absorbent. Impurities simply adhere to the surface of these silky fibers, and are easily removed by rinsing. Therefore, in the case of wool and silk articles, there is no necessity to pound the articles as in the case of cotton articles.

It therefore is an important object of this invention to provide a method of dry cleaning various articles by merely immersing, squeezing, and rinsing the articles.

A further object of the invention is to provide apparatus which is capable of handling articles for dry cleaning the same by repeatedly immersing them in a cleaning solvent, squeezing the articles free the same of the solvent, and rinsing the articles to remove from the surfaces of the same the dirt or other impurities which have accumulated thereon.

A further object of the invention is to provide apparatus for cleaning, drying and aerating articles without necessitating their transfer or removal from their original container.

Another object of the invention is to provide apparatus for maintaining a predetermined quantity of cleaning solvent, such as trichlorethylene, free from solid matter, impurities and oily substances, whereby articles subjected to the action of the solvent will be treated constantly by pure solvents.

Another object of the invention is to provide improved means for drying fabrics by subjecting the same to heated air maintained in a closed circuit during the drying operation and for removing the moisture from the drying air maintained in said circuit.

Still another object of the invention is to provide improved means for supporting and agitating articles while housed within a cleaning chamber; the said means accomplishing a reciprocatory movement of the articles, as distinguished from a rotary or tumbling movement, for the purpose of preventing the development of friction, the tearing or damaging of the articles, etc.

Other objects and advantages of the invention will become apparent during the course of the following description:

In the accompanying drawings forming a part of this specification, and in which like numerals are employed to designate like parts throughout the same, Figure 1 is a front elevational view of the apparatus or plant embodying this invention;

Figure 2 is a top plan view of the apparatus;

Figure 3 is a side elevational view of the apparatus;

Figure 4 is a side elevational view of the apparatus taken in the opposite direction to the view shown in Fig. 3;

Figure 8 is a detailed top plan view of an article carrier adapted to be reciprocated within a washing chamber;

Figure 9 is a vertical sectional view of the carrier shown in Fig. 8;

Figures 10 and 11 are top plan and side elevational views, respectively, of a removable carrier bar adapted to be attached to the carrier shown in Figs. 8 and 9;

Figure 12 is a vertical sectional view taken on line 12—12 of Fig. 11;

Figure 1:
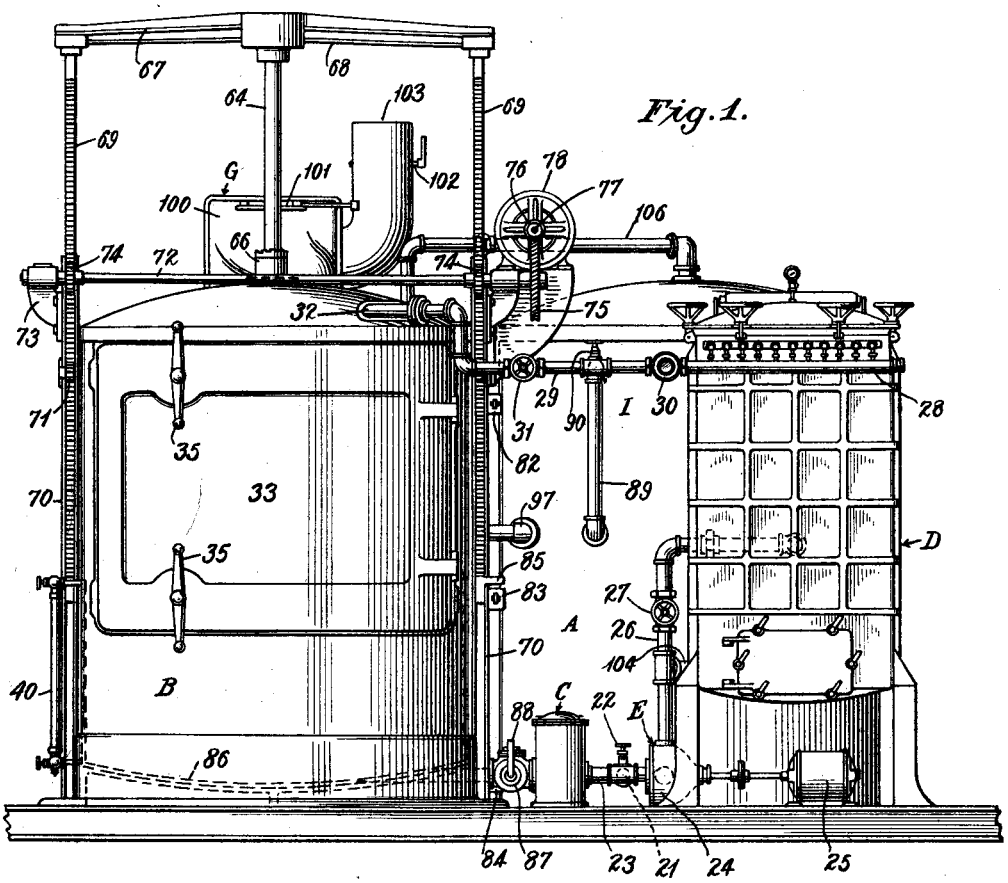

Figures 13 to 17 inclusive are elevational views and a top plan view of two different forms of hangers employed for attaching articles to the carrier bar disclosed in Figs. 10 to 12 inclusive;

Figure 18 is a wiring diagram for controlling the motor employed to drive the carrier positioned within the washing chamber; and Figure 19 is a graph intended to illustrate the type of movements or strokes imparted to the article carrier positioned within the washing chamber.

The apparatus first will be described in a general way to enable those skilled in the art to quickly arrive at a general understanding of the invention:

The solvent employed for cleaning the articles being treated by this apparatus and being subjected to the steps of the process carried out by the apparatus, is initially maintained in a storage tank A. This solvent, or a predetermined portion of the same, is transferred to a cleaning or washing chamber B by suitable conveying pipes, or the like. The articles to be cleaned are positioned within the chamber B upon suitable carrying mechanism, and the cleaning chamber is closed to seal the articles therein. During the washing or cleaning operation, the solvent transferred to the washing chamber is maintained in constant circulation through a closed circuit which includes a trap C for removing buttons and other solid matter, and a filtering unit D. A pump E also is positioned in this circuit to cause circulation of the solvent. After the washing and rinsing operation is completed, the solvent is returned to the storage tank A and a circulation of heated air is then established. This air is caused to circulate by a blower unit F, and while being circulated is heated by a heater structure G. The moisture removed from the articles by the circulating air is condensed in the condenser unit H and the condensate is returned to the storage tank A. After the articles have been subjected to this circulation of heated air until no moisture remains in the articles, the air circuit is changed to cause unheated air or air from the room in which the plant is being operated, to be passed through the chamber B. This unheated air is employed for cooling and aerating the articles.

The solvent employed for cleaning the articles, notwithstanding the action of the filter D, will become impregnated with oily substances. For this reason, the solvent positioned in the storage tank A may be periodically transferred to a still I which is positioned within the same housing which constitutes the storage tank A. The storage tank is located in the lower portion of this housing and the still is positioned in the upper portion.

The device will now be described in detail:

The storage tank A may be of any desired capacity and, preferably, is provided with a gauge 20, which will indicate the amount of solvent present in the tank. This tank is connected by a pipe 21 having a valve 22 positioned therein, to a second pipe 23. This pipe connects with a pump 24 which is driven by the motor 25. The outlet for this pump consists of a vertical pipe 26 having a control valve 27 interposed therein. The pipe 26 discharges into the filter D adjacent the lower portion of the same. No attempt has been made to illustrate the details of this filter unit, as any desired form of filter may be employed. The solvent, in being drawn from the storage tank A, passes into the lower portion of this filter, and is forced upwardly through the same to be discharged at the upper portion thereof into a manifold 28. This manifold 28 connects with a pipe 29 which has a sight glass 30 interposed therein. A control valve 31 is also provided for this pipe 29. A connection 32 is established between the pipe 29 and the upper portion of the cleaning or washing chamber B.

The washing cylinder or chamber is made of any desired capacity, and includes a hinged door 33 which is locked in its closed position by means of the bolts 34, and the actuating handles 35. It is to be understood that suitable packing means are provided for the margins of this door 33, and that the bolts 34 may be of a cam or wedge type to tightly force the door against the margins of the opening closed by the same and to compress the packing material sufficiently to establish a tight seal. This packing material has not been illustrated as it forms no material part of the invention.

Figure 6:
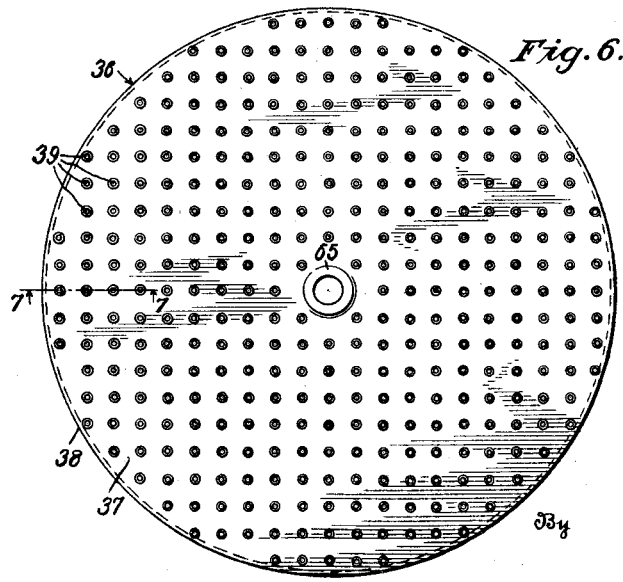
Figure 6 is a detailed top plan view of a solvent distributing plate positioned within the washing chamber.
Figure 7:
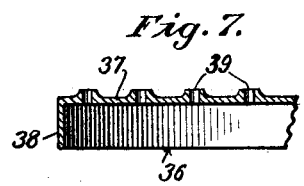
Figure 7 is a fragmentary vertical sectional view taken on line 7—7 of Fig. 6.

Located in the upper portion of the chamber B and directly below the point of connection 32 with the pipe 29 is a flood or distributor plate 36. This plate is illustrated in detail in Figs. 6 and 7, and consists of a flat body portion 37 having a right angularly arranged marginal flange 38 by means of which the plate is secured to the wall of the chamber B. At regularly spaced intervals throughout the area of the flat body portion 37, there are provided upstanding apertured nipples or bosses 39. It will be understood that when the solvent is fed into the chamber B through the pipe 29, the solvent will flow onto the distributor plate 36, and will flood the same until the level of the solvent reaches the upper ends of the bosses 39, whereupon it will overflow into the apertures of the bosses and will be discharged into the lower portion of the chamber. This flooded type of distributor will assure a uniform distribution of the solvent throughout the entire cross-sectional area of the washing chamber, with the result that articles placed within the chamber will be uniformly subjected to the action of the solvent.

The cleaning or washing solvent will be delivered into the chamber B in the manner just described until a desired quantity of the solvent is located in the chamber. The level of the solvent may be determined by inspecting the gauge 40.

Figure 5:
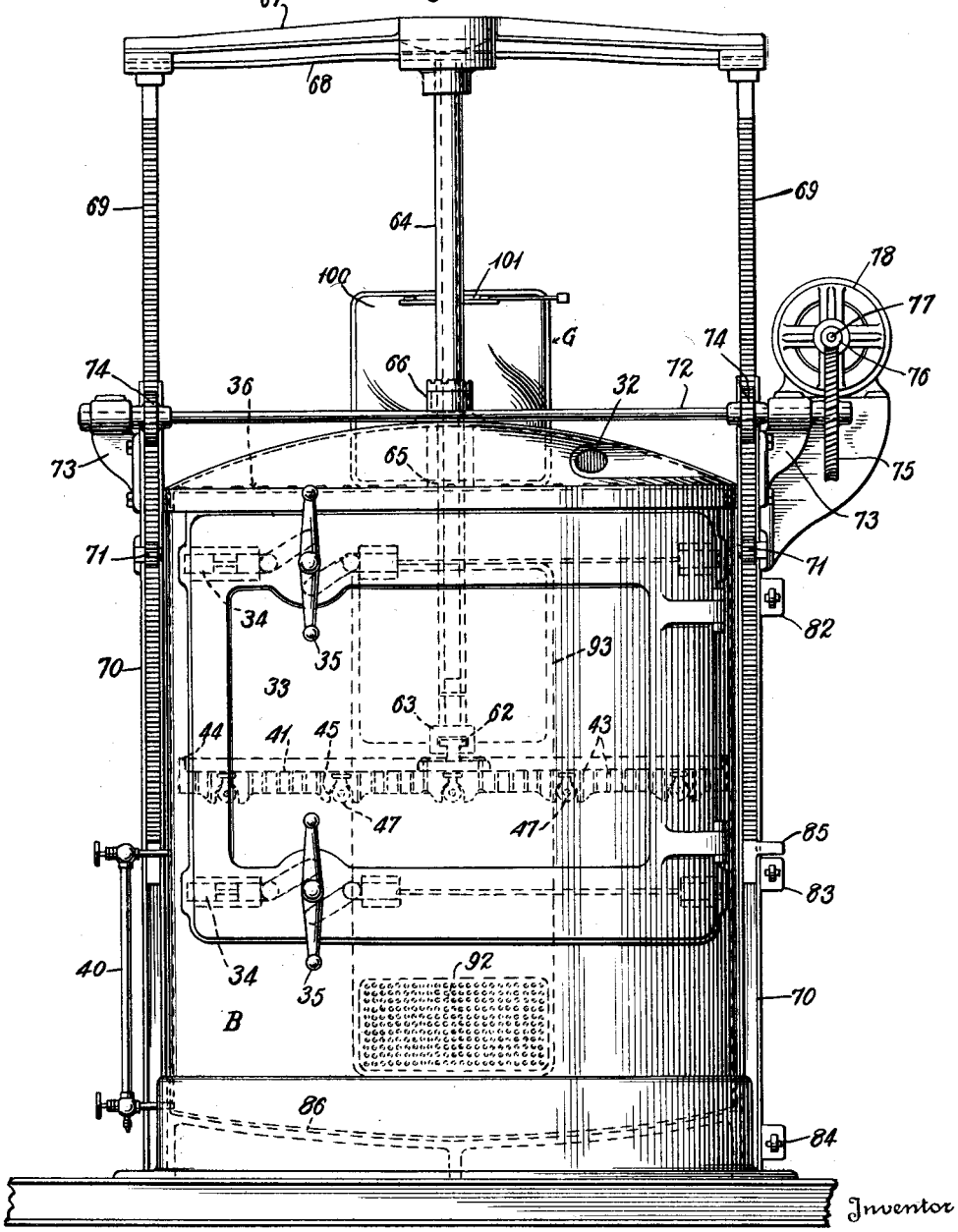
Figure 5 is a front elevational view showing in detail the washing chamber and the mechanism employed for supporting and agitating articles positioned therein.

In Figs. 5, 8 and 9, there is disclosed in detail a carrier plunger 41, which includes a disc-like body portion 42 having uniformly distributed thereover a multiplicity of apertures 43. The margin of this body portion 42 is formed with an upstanding flange 44. Arranged at suitable spaced intervals across the lower face of this body portion 42 are a plurality of transversely extending grooves 45 which are formed with reduced portions 46. These grooves 45 are intended to receive carrier bars 47 which are illustrated in detail in Figs. 10 to 12 inclusive. Each carrier bar consists of a rigid back 48 of substantially T-formation in vertical section. At the opposite ends of the back 48, apertured, depending ears 49 are provided and receive the opposite ends of a rod 50. It will be understood that the back portion 48 of the bars will fit into the reduced portions 46 of the grooves 45, when the bars are inserted lengthwise into these grooves.

For attaching the articles to be cleaned to the carrier bars 47, I have designed two different forms of hangers. These hangers are illustrated in detail in Figs. 13 to 17 inclusive. It is to be understood, however, that I do not desire to be restricted to either of the types of hangers illustrated, as any suitable form of hanger may be employed.

The hangers shown in Figs. 13 and 14, consist of a main bar or back portion 51 having a hook 52 attached thereto. Hinged at 53 to one end of the back 51 is a clamping bar 54. To secure an article 55 to this type of hanger, a portion of the article is located between the back 51 and the clamping bar 54, and the said bar is moved into parallelism with the back, as best illustrated in Fig. 13. To maintain the clamping bar in this closed position, I have provided a locking cap 56 which is hinged to the back 51, and may be arranged as shown in Fig. 13 to lock the clamping bar to the back.

In Figs. 16 and 17 inclusive, I have shown a hanger which includes the hinged clamping jaws 57. These jaws have actuating portions 58 which extend above the hinge pintle 59, and have interposed between the same the expanding springs 60 which are of substantial U-shape. A hook 61 is suitably connected to these actuating portions 58 of the jaws.

It is to be understood that in attaching the hangers to the carrier bars 47, the hooks 52 and 61 are merely engaged with the carrier rods 50.

It is intended that the carrier 41 be reciprocated vertically within the cleaning chamber B. For this reason, a stud 62 is centrally secured to the carrier. This stud is connected to a jaw 63, which, in turn, is attached to the lower end of a rod 64. This rod passes vertically through the chamber B, and passes through an aperture 65 formed centrally in the distributor 36 to pass outwardly of the chamber through a packing member 66. The upper end of this rod is connected to a cross-head 67 with a spring 68 interposed in this connection so that the rod 64 may have slight axial movement with respect to the cross-head for a purpose to be described in detail at a further point.

At the opposite ends of the cross-head 67, depending rack bars 69 are connected thereto. These rack bars extend downwardly to travel in guiding grooves or channels 70 positioned at opposite sides of the cleaning chamber B. Bracing and guiding pinions 71 are provided for each channel 70, and function to maintain the rack bars 69 slidably seated in the said channel 70.

For the purpose of reciprocating these rack bars 69, a horizontal shaft 72 is journalled in bearing brackets 73. This horizontal shaft 72 has suitably keyed thereto a pair of pinions 74, one pinion being provided for each rack bar 69. One end of the horizontal shaft 72 projects laterally beyond the bearing bracket 73, and has keyed thereto a worm wheel 75 which meshes with a worm pinion 76 positioned on the shaft 77 of the electric motor 78.

It is intended that this electric motor 78 be controlled to bring about a peculiar cycle of operation or movement of the carrier 41. In Fig. 19, there is disclosed a graph which is intended to illustrate this peculiar movement. The station or point 79 is intended to represent the carrier at its uppermost position. The carrier is moved downwardly until it reaches the station or point 80 which is adjacent the bottom wall of the chamber B. The carrier then is moved upwardly to an intermediate station 81 when its direction of movement is reversed, and it is again returned to the station 80. The carrier is then reciprocated through this shorter stroke, which is limited by the stations 80 and 81, for any desired number of strokes, after which the carrier returns to its uppermost position on station 79. The cycle illustrated in Fig. 19 is then repeated any desired number of times.

The particular cycle of operation or movement of the carrier 41, as described above, is intended to accomplish a very thorough cleaning of the objects or articles being treated. The carrier upon being moved from the station 79 to the station 80 is submerged in the cleaning bath contained in the lower portion of the chamber. The articles will become thoroughly saturated with the cleaning solvent and as the carrier approaches the bottom wall of the chamber, the articles will be compressed between the carrier and said bottom wall. This squeezing or compressing of the articles will cause the solvent absorbed by the fibers of the same to be forced out of or expelled from said fibers. When the carrier is caused to move from the station 80 to the station 81, the compressing force will be removed from the articles and they will be permitted to again absorb the cleaning solvent from the bath. As the carrier is repeatedly moved between the stations 80 and 81, as shown in the graph of Fig. 19, the articles will be repeatedly agitated, compressed, and allowed to expand or unfold. This repeated compressing, unfolding and agitating will cause dirt and other impurities adhering to the various fibers of the articles to be loosened. When the carrier is again moved from the last station 80 in the graph to the station 79, the articles are permitted to depend from the carrier free of the bath and they will assume new positions wherein new surfaces of the articles will be exposed. While the carrier is in its uppermost position and during its movement from the level of the station 81 to the level of the station 79, the portions of the articles removed from the bath will be sprayed with a cleaning solution to thoroughly rinse from the surfaces of the articles all particles of dirt or impurities which have been loosened by the repeated agitating and squeezing operation which took place during the movement of the carrier between the stations 80 and 81. After being thoroughly rinsed to remove the loosened impurities, the carrier is again moved into the lower portion of the chamber where the shorter strokes are repeated for loosening additional impurities or particles of dirt.

To bring about this operation of the carrier 41, one of the guideways or channels 70 has secured to the outer side thereof a plurality of switches 82, 83 and 84. Cooperating with these switches is an actuating lug 85 which is carried by one of the rack bars 69. It is to be understood that the lug 85 is located at the upper switch 82 when the carrier 41 is at the position or station 79. The motor 78 is then rotated in a direction which will cause the rack bars to move downwardly with the result that the carrier 41 also moves downwardly. The switch actuating lug 85 may travel downwardly past the switch 82 without effecting a change in the operation of the motor 78. The lug also passes downwardly past the switch 83 without effecting any change in the control of the motor. When the lug 85 engages the actuating arm of the switch 84, the circuit through the motor 78 is effected to bring about a reversal of the direction of rotation of the armature of this motor with the result that the rack bars, with the carrier 41, are caused to move upwardly. During this return movement, when the lug 85 engages the actuating arm of the switch 83 and moves said arm, the circuit of the motor 78 is changed to effect a reversal in rotation of the motor armature. The rack bars, the carrier and the lug 85 are then caused to move downwardly and the engagement of the lug 85 with the actuator arm of the switch 84 again causes reversal of the motor 78. The switches 83 and 84 control the reciprocation of the carrier 41 to accomplish any desired number of short strokes, as illustrated between the stations 80 and 81 in Fig. 19. A time controlled mechanism effects the operation of the switch 83 so that after a desired number of short strokes, the switch 83 is rendered inoperative, and the rack bars with the carrier 41, are permitted to move upwardly until the lug engages the switch 82, with the result that a long stroke between stations 79 and 80 is brought about.

The electrical control for the motor 78 will be described in detail in connection with Fig. 18 at a later point.

This peculiar movement of the carrier 41 will cause the articles attached to the carrier to be moved downwardly for immersing the articles in the solvent located in the lower portion of the cleaning chamber B. The carrier moves downwardly a sufficient distance to cause the articles to be squeezed or pressed between the carrier and the bottom wall 86 of the chamber B. This compressing or squeezing of the clothing is intended to drive out the major portion of the solvent. The spring 68, interposed between the rod 64 and the cross-head 67 functions to take care of any variation in mass or quantity of the articles interposed between the carrier 41 and the bottom wall 86 of the chamber B during this squeezing or compressing operation. In other words, the rod 64 is permitted to have a desired amount of relative movement with respect to the cross-head 67. Due to the control of the motor 78, the carrier then is reciprocated through several short strokes, which brings about a repeated submerging of the articles in the solvent and a repeated squeezing or pressing of the articles to force out the solvent. After a desired number of short strokes, the carrier is returned to its uppermost position or station 79 to permit the articles to hang more or less free of each other, so that they may assume new positions and be rinsed to effect removal of dirt loosened by the squeezing action, after which the carrier is moved downwardly. The carrier is then moved through several more short strokes.

By inspecting the several figures of the drawings, it will be seen that the pipe 23 is connected with the button or solid matter trap C. Interposed between this trap and the lower portion of the washing chamber B is a valve 87 having an operating handle 88. This valve controls communication between the chamber B and the trap C.

As soon as the washing operation starts, that is, as soon as the carrier 41 starts to reciprocate within the chamber B, the pump 24 is started and the solvent is gradually and continuously drawn off to be passed through the trap C and the filter D for returning this purified solvent to the upper portion of the washing chamber B, where it is sprayed downwardly over and between the articles being treated for rinsing the impurities, dirt and the like from the articles. This circulation of the cleaning solvent continues as long as the articles are agitated by the movement of the carrier 41.

After the cleaning operation has been completed, the solvent is drawn from the chamber B and passed through the filter D to be discharged therefrom into the pipe 29 from which it is delivered to the pipe 89, controlled by the valve 90. The solvent flows through the pipe 89, and is returned to the storage tank A.

The next step to be accomplished is the drying of the articles and this is accomplished without removing the articles from the chamber B. The motor 78 is stopped with the carrier 41 at its uppermost position or station 79. The blower F is then started and is operated by the electric motor 91. This blower draws the air from the lower portion of the chamber B through the apertured plate 92 which communicates with a perpendicular conduit 93. The upper end of this conduit 93 branches laterally for being connected with a condenser unit H, which may be of any desired construction. A valve 94 which consists of a plurality of pivoted shutters, is located at the point 95, or between the blower F and the heater G. A pipe 96 is connected to this condenser and extends to the point 97, where it communicates with the storage tank A. This pipe 96 is provided with a sight glass 98 and is employed for returning the condensate from the condenser H to the storage tank. The air passes from the condenser into the blower F and is discharged therefrom into the elbow 99 which conducts the air to the heater unit G. From the heater unit, the air passes through the elbow 100 to be discharged into the upper portion of the washing chamber B above the distributor plate 36, which tends to distribute the air throughout the entire cross-sectional area of the chamber B. This heated air continues to flow through this closed circuit until no more condensed solvent flows from the condenser H through the pipe 96 to the storage tank A. The presence or absence of condensed solvent in the pipe 96 may be determined by looking through the sight glass 98. After the clothing has been thoroughly dried, the damper 101 in the elbow 100 is opened, and the damper 102 in the branch 103 of the elbow 99 is opened. The shutter valve 94 is closed. With the blower F still operating, it will be seen that air will be drawn into elbow 100 through the opening controlled by the damper 101, and this air taken from the room, or unheated air, will be passed downwardly through the cleaning chamber B, outwardly of the same through the plate 92, into the conduit 93, upwardly through this conduit to the blower F and outwardly of the blower into the elbow 99. The closing of the shuttle valve 94 will cause this discharged air to be delivered into the branch 103 of the elbow 99, where it will be returned to the room. This circulation of unheated air through the chamber will cool and aerate the articles being treated therein.

After this cleaning, drying, aerating and cooling method is performed, the door 33 is then opened, and the articles removed from the chamber B by withdrawing the carrier bars 47 from the carrier 41. The carrier then may be recharged and another cleaning and drying operation performed.

It will be understood that the solvent will become impregnated with oil impurities removed from the articles being treated. For the purpose of purifying the solvent to remove this oily substance, the solvent is drawn from the storage tank A through the pipe 21 by means of the pump 24. The pump delivers the solvent into the pipe 26, and from this pipe into the pipe 104 which is provided with a valve 105. The pipe 104 discharges into the still I, where the solvent is distilled and vapors are removed from the top of the same through the pipe 106, which extends to the condenser H. The vapors are condensed in this unit H, and the solvent returned to liquid form is fed back to the storage tank A through the pipe 97.

In Fig. 18, the wiring for the electric motor 78 and the various control units, are disclosed diagrammatically. It will be noted that this figure includes the electric motor 78, one of the rack bars 69 with its switch operating lug 85, and the three switches 82, 83 and 84. The various control units included in this circuit consist of a phase reversing switch 107, a manually controlled switch 108, a time controlled switch 109, and a relay 110.

Three main line wires 111, 112 and 113, are provided and are connected by wires 114, 115, and 116, respectively, to stationary contacts 117, 118, and 119, of one part of the phase reversing switch or relay 107. Branch wires 120, 121 and 122, connects the wires 114, 115, 116 with a second set of stationary contacts 123, 124 and 125 of the second half of the phase reversing relay 107. The contacts 117, 118 and 119 have associated therewith movable contact arms 126, 127 and 128. These contact arms are connected by the rod 129 with the armature 130 of a solenoid coil. These movable contact arms 126 to 128 inclusive are connected respectively to wires 129', 130' and 131', which extend to the three phase windings of the motor 78. The stationary contacts 123, 124 and 125 have associated therewith movable contact arms 132, 133 and 134. These arms are connected by a rod 135 with the armature 136 of a solenoid coil 137. The arms 132 to 134 inclusive are connected by branch wires 138, 139 and 140 with the wires 131', 129' and 130', respectively. These various elements numbered from 114 to 140 constitute the phase reversing circuit and the motor supply portion of the control system. The solenoid winding 131 is connected by a wire 141 to the main line 113. The second terminal of this solenoid winding 131 is connected by a wire 142 to the contact 143 of the relay 110. Paired with this contact 143 is a second contact 144 which is connected to a wire 145 which leads to one contact 146 of the manual switch unit 108. The solenoid coil 137 is connected at one side to the main line wire 113 by means of the wire 147. The remaining terminal of the solenoid coil 137 is connected by a wire 148 to a contact 149 which has paired with the same a contact 150. This contact 150 is connected by a wire 151 to a wire 152 which is connected to a contact 153 of the relay 110. The wire 151 also is connected to a wire 154 which extends from the stationary contact 155 of the switch 84 to a wire 156. This latter wire is connected to a contact 157 of the manual switch 108, and also is connected to the main supply wire 112. Paired with the stationary contact 153 is a contact 158. This contact has connected thereto a wire 159 which extends to and is connected with a wire 160. This wire extends between the movable contact 161 of the switch 84 and a movable contact 162 of the switch 82.

The stationary contact 163 for the switch 82 is connected by a wire 164 with the brush 165 of a time controlled switch 109. This switch further includes a rotatable contact or ring 166 having an interrupted portion 167. When the brush 165 is opposite the interrupted portion 167, no current flows between the brush and the contact 166. When the brush engages the interrupted peripheral portion of the contact 166, the circuit through the wire 164 is completed through a wire 168 which extends to the stationary contact 169 of the manual switch 108. The wire 160 described as connecting the movable contact arms 161 and 162 of the switches 84 and 82 respectively, also is connected with the movable contact arm 170 of the switch 83 by the branch wire 171. The stationary contact 172 of this switch 83 is connected by a wire 173 to the stationary contact 174 of the manual switch 108. The shaft supporting the rotatable contact or ring 166 is connected to the armature of a synchronous motor 175 which includes the winding 176. One terminal of this winding is connected by a wire 177 with the contact 146 of the hand switch 108. The second terminal of this winding 176 is connected by a wire 178 with the wire 147, previously described.

The pair of stationary contacts 143 and 144 are adapted to be selectively bridged by a bar 179. A bar 180 is adapted to selectively bridge between the contacts 149 and 150. A bar 181 is adapted to selectively bridge between the contacts 153 and 158. These bars 179 to 181 inclusive are connected to a stem 182, which in turn is connected to the movable armature or core 183 of a solenoid winding 184. One terminal of this winding is connected to the wire 159 which extends to the wire 160 common to all of the movable contact arms of the three switches 82, 83 and 84. The second terminal of this solenoid winding 184 is connected in series with a resistance winding 185 which is interposed in the wire 147.

This automatic control may be described as to its mode of operation in the following manner:

It will be considered that the clothes carrier 41 is at its uppermost position with the lug 85 on the rack 69 located in the vicinity of the uppermost switch 82. By closing the manual switch 108, a circuit is established through the winding 176 of the synchronous motor which controls the time switch 109. The bridging bar 179 is in the position illustrated in this figure, and is bridging between the contacts 143 and 144. With the closing of the manual switch 108, a circuit is established through the winding 131 and the contact arms 126 to 128 inclusive are moved into engagement with the stationary contacts 117 to 119 inclusive for starting the motor 78. The rack 69 moves downwardly and the lug 85 engages the arms 162 and 170 of the switches 82 and 83 for closing the circuits of these switches. The closing of these circuits, however, does not function to alter the operation of the motor 78. When the lug 85 engages the contact arm 161 of the switch 84, the circuit controlled by this switch is closed, and the solenoid coil 184 is energized for lifting the three inter-connecting bridging bars 179, 180 and 181 for breaking the circuit between the contacts 143 and 144 and for establishing circuits between the contacts 149 and 150 and 153 and 158. This movement of the bar 179 breaks the circuit to the solenoid winding 131. The bridging between the contacts 149 and 150 closes a circuit to the winding 177. The energizing of this winding 177 shifts the contact arms 132 to 134 inclusive into engagement with the contacts 123 to 125 respectively. The motor 78 is then energized to cause its armature to rotate in a reverse direction, with the result that the rack 69 starts moving upwardly. It is understood that the synchronous motor 175 is operating in suitable timed relation so that the brush 165 will be in contact with the periphery of the rotatable element 166. When the lug 85 engages the contact arm 170 of the switch 83, the circuit through this switch is closed and the solenoid winding 184 will be shorted for releasing the bridging bars 179 to 181 inclusive, with the result that these bars will drop to reestablish a circuit between the contacts 143 and 144 and to break the circuit between the pairs of contacts 149 and 150, and 153 and 158. A resistance winding 185 is interposed in the circuit for the winding 184 to prevent a dead short in this circuit. It will be understood that the movement of the bridging bars 179 to 181 inclusive, will de-energize the winding 136 and energize the winding 131 for again reversing the direction of rotation of the armature for the motor 78. The switches 83 and 84 will continue to control the direction of operation of the motor 78, causing the carrier connected to the rack 69 to reciprocate through the short strokes extending between the positions 80 and 81 shown in Fig. 19, until the rotatable contact or ring 166 has been moved to bring the interrupted portion 167 opposite the brush 165. When this occurs, the switch 83 will be rendered inoperative to short the solenoid winding 184, and the motor 78 will continue to operate for lifting the rack 69 to its extreme uppermost position. During its upward travel, the lug 85 will actuate the switch 82 to establish a circuit therethrough for shorting the winding 184, with the result that the circuits through the windings 137 and 131 are reversed for causing the motor 78 to operate to move the rack 69 with the clothes carrier 41 downwardly. The cycles of operation illustrated by the graph appearing in Fig. 19 are repeated as long as desired, and the hand switch 108 is then moved to its open position. This hand switch may be opened at any time during the movement of the carrier. If proceeding toward its uppermost position, it will continue such movement until that position is reached, but if it is moving downwardly, this stroke will be completed and then the carrier will be moved into its uppermost position and stop.

The mode of operation of the entire system has been more or less described in connection with the description of the various elements. It might be well to state, however, that when a washing operation is to be started, the valves 22, 27 and 31 are opened and the valves 90, 105 and 87 are closed. The motor 25 is started for placing in operation the pump 24. This pump is operated until a suitable amount of washing solvent is transferred from the storage tank A to the washing cylinder B. After the washing cylinder or chamber B is properly filled, valve 87 is opened and valve 22 is closed. Valve 27 is left in its open position. The clothes carrier, in the meantime, has been started to reciprocate, and during this reciprocatory movement, the cleaning solvent is gradually drawn off from the washing chamber B, passed through the button trap C, and through the filter D, and is returned to the upper portion of the washing chamber where it is uniformly distributed by the distributor plate 36 and the apertures in the carrier 41, and sprayed over all of the articles attached to the carrier to thoroughly and uniformly rinse said articles. This washing operation is continued as long as desired, and after its completion, the solvent is returned to the storage tank by closing the valve 31 and opening the valve 90. After the solvent is entirely returned to the storage tank A, the valve 87 is closed.

It periodically becomes necessary to distil oil and the like from the cleaning solvent and to bring about this operation, valves 22 and 105 are opened and valves 90 and 27 are closed. The pump 24 is either left in operation or placed in operation to cause the desired transfer of the solvent from the storage tank into the still I. After the transfer of the solvent has been accomplished, the still is placed in operation and the pump 24 is stopped. Valve 105 is closed. The vapors from the still leave the latter through the pipe 106 and flow into the condenser H from which the condensed solvent returns to the storage tank A through the pipe 96.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. A method of cleaning fabric and fibrous articles comprising repeatedly immersing the articles and withdrawing the same from a cleaning bath, repeatedly agitating and squeezing the articles during each immersion in the bath, and spraying the articles with a rinsing fluid each time they are withdrawn from the bath.

2. A method of cleaning articles comprising alternately submerging the articles in and withdrawing the same from a cleaning bath, subjecting the articles to pressure at intervals during each submersion for squeezing the bath material therefrom, and uniformly spraying all of the articles with a rinsing fluid when withdrawn from the bath.

3. A method of cleaning fabric and the like, comprising alternately submerging the fabric in and withdrawing the same from a cleaning bath, subjecting the articles to pressure at intervals during each submersion for squeezing the bath material therefrom, and withdrawing fluid from the bath and spraying it onto the articles for rinsing the latter when withdrawn from the bath.

4. A method of cleaning wearing apparel, comprising alternately submerging the wearing apparel in and withdrawing the same from a cleaning bath, subjecting the wearing apparel to pressure at intervals during each submersion for squeezing the bath material therefrom, withdrawing fluid from the bath, and rinsing the fabric when withdrawn from the bath with clean fluid while returning the latter to the bath.

5. A method of cleaning articles comprising alternately submerging the articles in and withdrawing the same from a cleaning bath, subjecting the articles to pressure at intervals during each submersion for squeezing the bath material therefrom, continuously withdrawing fluid from the bath, and spraying the articles when withdrawn from the bath with clean fluid while returning the latter to the bath.

6. A method of cleaning fabric and the like comprising submerging the fabric in a cleaning bath, repeatedly agitating and squeezing the fabric being cleaned during the period of submersion in the bath, after a predetermined number of agitating and squeezing operations have been performed, withdrawing the fabric from the bath, simultaneously spraying all of the fabric with a cleaning solvent while withdrawing from the bath, and repeating the above mentioned steps until the fabric is cleaned.

7. A method of cleaning fabric and the like comprising submerging the fabric in a cleaning bath, repeatedly agitating and squeezing the fabric being cleaned during the period of submersion in the bath, after a predetermined number of agitating and squeezing operations have been performed, withdrawing the fabric from the bath, rinsing the fabric during such withdrawal, and repeating the above mentioned steps until the fabric is clean.

8. A method of cleaning fibrous articles, comprising suspending the articles so as to hang loosely above a bath of cleaning solvent, submerging the articles in said bath, repeatedly reciprocating the articles while submerged to agitate and squeeze the same, withdrawing the articles from the bath to permit the same to assume new positions, rinsing the articles while withdrawn, and repeating the above mentioned steps until the articles are cleaned.

9. A device of the type described comprising a cleaning chamber adapted to contain a supply of cleaning fluid, a carrier for the objects to be cleaned positioned in the chamber and adapted to be moved through a given path, and means for repeatedly moving said carrier relatively long and short distances through said path during a given working cycle.

10. A device of the type described, comprising a cleaning chamber adapted to contain a supply of cleaning fluid, a longitudinally reciprocating carrier for the objects to be cleaned movably positioned in said chamber, means for repeatedly reciprocating said carrier through relatively long and short strokes during a given working cycle, and means for rinsing said objects during certain of said strokes.

11. A device of the type described, comprising a cleaning chamber adapted to contain a supply of cleaning fluid, a movable, perforated carrier for the objects to be cleaned positioned in said chamber, means for moving said carrier into and out of the bath and to effect a squeezing action on the objects while immersed in the bath, control means for the last mentioned means to cause the carrier to be moved different distances during a given working cycle to repeatedly effect said squeezing action during each immersion in the bath, and means for supplying a cleaning fluid to the carrier to cause the same to pass through said perforations to spray said objects.

12. A device of the type described, comprising a cleaning chamber adapted to contain a supply of cleaning fluid, a movable, perforated carrier for the objects to be cleaned positioned in said chamber, means for moving said carrier into and out of the bath and to effect a squeezing action on the objects while immersed in the bath, control means for the last mentioned means to cause the carrier to be moved different distances during a given working cycle to repeatedly effect said squeezing action during each immersion in the bath, and means for uniformly supplying a cleaning fluid to all the perforations of said carrier so that all of the objects on the carrier will be uniformly sprayed.

13. A device of the type described, comprising a cleaning chamber adapted to contain a bath of cleaning fluid, a carrier for the objects to be cleaned positioned in said chamber, means for moving said carrier into and out of the bath and to effect a squeezing action on the objects while immersed in the bath, and means for controlling said last mentioned means to cause said last means to repeatedly effect said squeezing action during each immersion in the bath.

14. A device of the type described, comprising a cleaning chamber adapted to contain a bath of cleaning fluid, a carrier for the objects to be cleaned positioned in said chamber, means for moving said carrier into and out of the bath and to effect a squeezing action on the objects while immersed in the bath, means for controlling said last mentioned means to cause said last means to repeatedly effect said squeezing action during each immersion in the bath, and transversely extending means coextensive with the cross section of the chamber for distributing a rinsing fluid over the articles when withdrawn from the bath.

15. A device of the class described comprising a cleaning chamber adapted to contain a bath of cleaning fluid, a perforated carrier for the objects to be cleaned positioned in said chamber, means for moving said carrier into and out of the bath and to effect a squeezing action on the objects while immersed in the bath, means for controlling said last mentioned means to cause said last means to repeatedly effect said squeezing action during each immersion in the bath, and means for uniformly supplying a cleaning solvent to all of the perforations of said carrier to cause the objects to be uniformly sprayed.

16. A device of the class described comprising a cleaning chamber adapted to contain a bath of cleaning fluid, a perforated carrier for the objects to be cleaned positioned in said chamber, means for moving said carrier into and out of the bath and to effect a squeezing action during each immersion in the bath, means for controlling said last mentioned means to cause said last means to repeatedly effect said squeezing action during each immersion in the bath, and a flooded distributor plate positioned above the carrier for uniformly supplying a cleaning fluid to all of the apertures of said carrier.

EMANUEL J. PERRY.